United States Patent
Mallapur et al.

(10) Patent No.: US 10,587,136 B2
(45) Date of Patent: Mar. 10, 2020

(54) PARALLEL CHARGING ARCHITECTURE

(71) Applicant: QUALCOMM Incorporated, San Diego, CA (US)

(72) Inventors: Vinayakumar Prakash Mallapur, Belgaum (IN); Anand Kudari, Bangalore (IN); Prashanth Pai, Udupi (IN)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 15/643,412

(22) Filed: Jul. 6, 2017

(65) Prior Publication Data

US 2019/0013685 A1    Jan. 10, 2019

(51) Int. Cl.
  *H02J 7/00*  (2006.01)
  *H02J 1/10*  (2006.01)
  *H02J 7/04*  (2006.01)

(52) U.S. Cl.
  CPC .............. *H02J 7/0052* (2013.01); *H02J 1/10* (2013.01); *H02J 7/0027* (2013.01);
  (Continued)

(58) Field of Classification Search
  USPC .................. 320/107, 108, 110, 138, 117
  See application file for complete search history.

(56) References Cited

U.S. PATENT DOCUMENTS 8,482,340 B2  7/2013 Shay et al.
9,276,430 B2  3/2016 Sporck et al.
(Continued)

FOREIGN PATENT DOCUMENTS

JP          5932696 B2    6/2016

OTHER PUBLICATIONS

Grbovic P.J., "Master/Slave Control of Input-Series- and Output-Parallel-Connected Converters: Concept for Low-Cost High-Voltage Auxiliary Power Supplies", IEEE Transactions on Power Electronics, Feb. 2009, vol. 24, No. 2, pp. 316-328.
(Continued)

*Primary Examiner* — Brian Ngo
(74) *Attorney, Agent, or Firm* — Paradice and Li LLP/Qualcomm

(57) ABSTRACT

Methods, devices, apparatuses, and systems may provide integrated combined current sensing for parallel charging architecture. In one embodiment a charger includes a first charging device that includes a switching circuit having a switching output configured to be coupled to a first terminal of an inductive element. The first charging device further includes a charging terminal configured to couple a second terminal of the inductive element to a battery terminal to provide a first power source to charge a battery coupled to the battery terminal. The first charging device further includes a charge current sense element coupled between the charging terminal and the second terminal of the inductive element. The charge current sense element is configured to sense a charge current at the charging terminal. The circuit further includes a second charging device that includes a second power source coupled to the second terminal such that the charge current comprises current from the first charging device and the second charging device.

29 Claims, 12 Drawing Sheets

(52) U.S. Cl.
CPC .......... *H02J 7/0045* (2013.01); *H02J 7/0055* (2013.01); *H02J 7/0072* (2013.01); *H02J 7/045* (2013.01); *H02J 2007/0062* (2013.01)

(56) References Cited

U.S. PATENT DOCUMENTS

| | | | |
|---|---|---|---|
| 2011/0050163 A1* | 3/2011 | Xiao | H02J 7/0072 320/107 |
| 2014/0347003 A1* | 11/2014 | Sporck | H02J 7/0052 320/107 |
| 2016/0149431 A1 | 5/2016 | Sporck et al. | |
| 2016/0190834 A1* | 6/2016 | Minakuchi | H02J 7/0021 320/117 |
| 2016/0320456 A1 | 11/2016 | Hawawini et al. | |
| 2017/0063140 A1* | 3/2017 | Lee | H02J 7/025 |
| 2018/0074564 A1* | 3/2018 | Paparrizos | G06F 1/266 |
| 2018/0102663 A1* | 4/2018 | Jung | H02J 7/0042 |

OTHER PUBLICATIONS

Mazumder S.K., "Master-Slave Current-Sharing Control of a Parallel DC-DC Converter System Over an RF Communication Interface", IEEE, Transactions on Industrial Electronics, Jan. 2008, vol. 55, No. 1, pp. 59-66.

International Search Report and Written Opinion—PCT/US2018/036549—ISA/EPO—dated Aug. 21, 2018.

\* cited by examiner

PARALLEL CHARGING ARCHITECTURE

BACKGROUND

As mobile computing devices (e.g., smart phones, computer tablets, and the like) continue to be used more widely, the use and prevalence of batteries is ever increasing. Such batteries can be charged in a variety of ways. Efficient charging allows a device to be mobile for a larger period of time and charging in a dock or plugged into an outlet less of the time. Disposable batteries and mobile boost chargers have also increased in use. Efficient charging methods can also increase the useful life of a battery, and address other issues, such as high temperatures that result during fast charge sequences.

SUMMARY

One aspect of the present disclosure generally provides a circuit for a battery charger, the circuit including a first charging device that includes a switching circuit having a switching output configured to connect to a first terminal of an inductive element. The first charging device further includes a charging terminal configured to electrically connect a second terminal of the inductive element to a battery terminal to provide a first power source to charge a battery connected to the battery terminal. The first charging device further includes a charge current sense element between the charging terminal and the second terminal of the inductive element configured to sense a charge current at the charging terminal. The circuit further includes a second charging device that includes a second power source connected to the second terminal of the inductive element such that the charge current comprises current from the first charging device and the second charging device.

In a further aspect, the present disclosure provides for a method including generating a switching output at a first terminal of an inductive element. The method further includes providing a first power source of a first charging device to a charging terminal by electrically connecting a second terminal of the inductive element to a battery terminal, such that the first power source charges a battery connected to the battery terminal. The method further includes providing a second power source of a second charging device to the charging terminal by electrically connecting the second power source to the second terminal of the inductive element, such that the second power source charges the battery connected to the battery terminal. The method further includes sensing, by a charge current sense element between the charging terminal and the second terminal of the inductive element, a charge current at the charging terminal comprising current from the first charging device and the second charging device.

Furthermore, the present disclosure provides for a device that includes means for means for generating a switching output at a first terminal of an inductive element. The device further includes means for providing a first power source of a first charging device to a charging terminal by electrically connecting a second terminal of the inductive element to a battery terminal, such that the first power source charges a battery connected to the battery terminal. The device further includes means for providing a second power source of a second charging device to the charging terminal by electrically connecting the second power source to the second terminal of the inductive element, such that the second power source charges the battery connected to the battery terminal. The device further includes means for sensing, by a charge current sense element between the charging terminal and the second terminal of the inductive element, a charge current at the charging terminal comprising current from the first charging device and the second charging device.

In addition, the present disclosure provides for a circuit a first charging device comprising a sensing element and a second charging device coupled to the first charging device and configured to provide a current or voltage through the sensing element to a battery. The first charging device is configured to provide a current or voltage through the sensing element to the battery. The first charging device may be coupled to a power supply, and the second charging device may be coupled to the power supply. The first charging device may include a first switching circuit and a filter may be coupled between an output of the first switching circuit and a charge output of the second switching circuit. Further, a node in the filter is coupled to the sensing element. The first charging device may include a primary charging device and the second charging device may include a slave charging device. The first charging device may be configured to provide a variable current to the battery and the second charging device may configured to provide a substantially constant current to the battery. Further, the sensing element may include a voltage sense element.

BRIEF DESCRIPTION OF THE DRAWINGS

The accompanying drawings, which are incorporated herein and constitute part of this specification, illustrate exemplary embodiments of the disclosure, and together with the general description given above and the detailed description given below, serve to explain the features of the various embodiments.

DETAILED DESCRIPTION

Figure 1A:
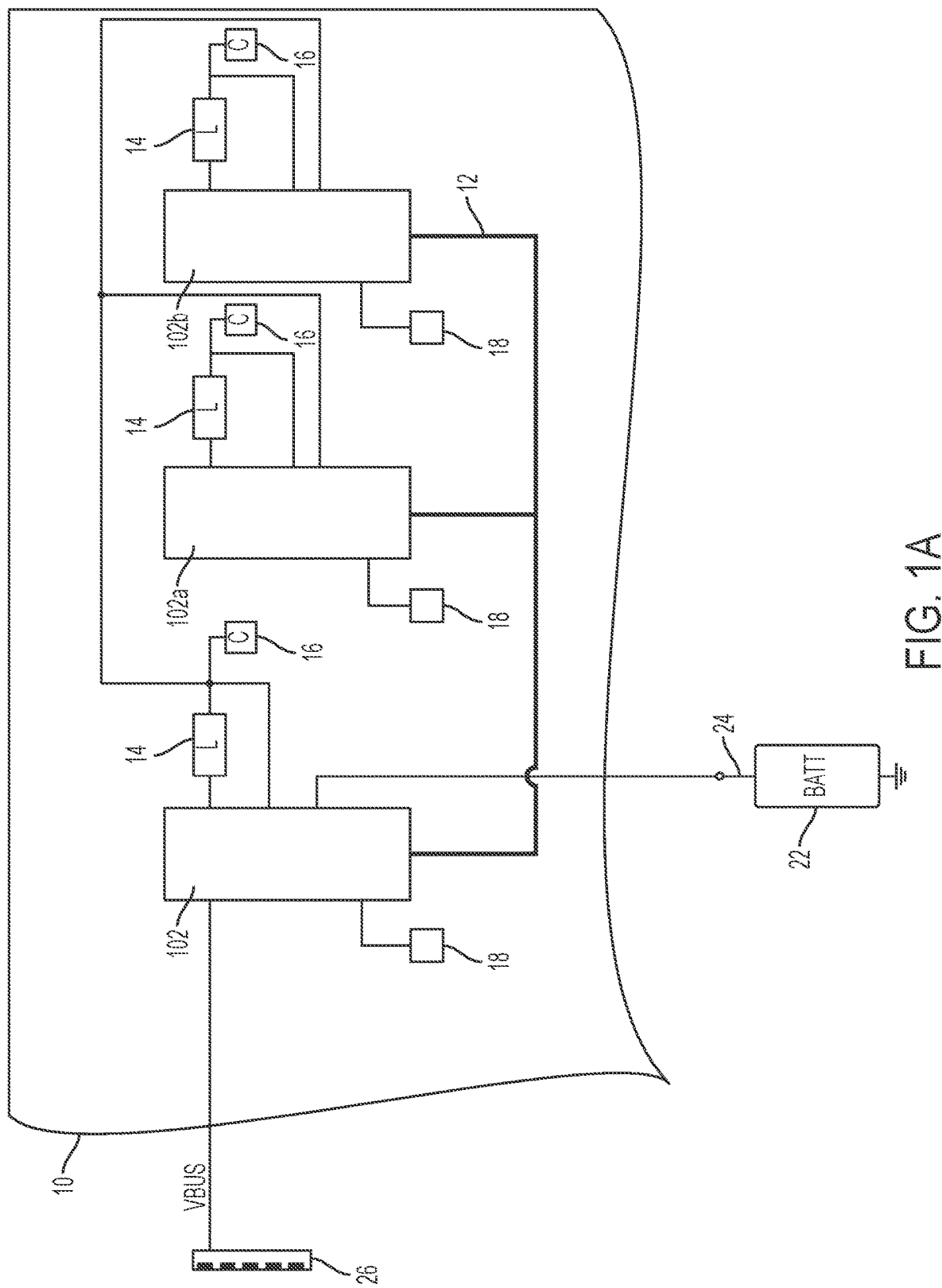
FIG. 1A shows a printed circuit board (PCB) level battery charger in accordance with various embodiments.

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Modern mobile devices often utilize multiple battery charging methods. Some examples include but are not limited to universal serial bus (USB) charging, wireless charging, wall/direct current (DC) charging, etc. Often, chargers have multiple charger devices within them and are used for more efficient and quicker charging and utilize a variety of charging methods. Often, using such multiple charger devices and methods includes implementing significant coordination, arbitration, handover, measurement, safety treatment, and/or other concerns that must be addressed to switch between and/or manage multiple charger devices within a charger.

Accordingly, disclosed herein is a multiple charger scheme. Certain embodiments reduce the number, complexity, size, cost, and footprint of components utilized for charging a battery. In one illustrative example, two or more charger devices are used. One of the charger devices is the primary/master charger device and uses a current sense element to monitor/gauge/sense the total current going to a battery terminal from all of the charger devices. In doing so, any secondary or slave charger devices have outputs that are summed with the primary output before a signal is applied to a battery. In this way, each of the charger devices share at least some of the same current path before the combined current reaches the battery, and the current sense element of the primary charger can be utilized to monitor the total current going to the battery from all of the charger devices.

Parallel charging features disclosed herein may provide faster charging with little to no risk or additional work on the part of the battery charger. Additionally, embodiments disclosed herein may allow for flexibility and scalability across different platforms, as certain embodiments provide for different combinations of primary and secondary charging devices.

In some embodiments, the parallel charging architectures do not utilize an external (to the charging devices) current sensing element, such as a low-ohmic resistor. As that an internal current sense element (such as a FET) of a primary charging device is used to sense the total current of all charging devices sending power to a battery in some such embodiments, a separate, external sensing element can be omitted as disclosed herein. Such an omission may saves money, fabrication time, and free up space on a circuit board to add other elements or reduce the size and cost of the circuit board itself or the pin count of one or both of the primary and secondary charging devices.

A charging method disclosed herein is referred to as a constant-current/constant voltage (CC-CV) method. It will be appreciated by one of skill in the art that constant currents and/or voltages may deviate slightly, but the term constant as used herein is meant to refer to approximately constant currents and/or voltages. The CC-CV charging method will be discussed further with respect to FIG. 2 below. Advantageously, embodiments disclosed herein reduce disadvantages previously inherent to managing primary and secondary charging devices in a CC-CV charging method. In particular, the CC-CV may maintain a constant current for a first stage of battery charging, then switches to a constant voltage in a second stage as current trails off and the battery becomes more charged.

Both master & slave chargers can be used as independent supplies adding their respective charging current to a battery. The total supplies are often measured by an element external to the charging devices themselves, such as a sense resistor element. Such systems often utilize significant intervention to stabilize charging in the CC-CV method, particularly where the transition between constant current and constant voltage takes place. Methods disclosed herein may allow for a simpler and more efficient management of a CC-CV charging method. In particular, when the currents from multiple chargers are each passed through a sense element of a master/primary charger, the master can adjust its output based on the total output of all chargers to ensure that a correct output is being sent to the battery for charging.

Advantageously, certain embodiments disclosed herein are also generally hardware autonomous. That is, the specific configuration of a slave charger, for example, does not need to be known to adjust the overall output of multiple chargers by a master charger device. Additionally, no software is utilized to control/reduce/suspend the function of a slave charger's current in a constant-voltage (CV) charging stage in some embodiments. This reduced complexity provides numerous cost savings and efficiency benefits. Significant flexibility for charging different batteries and/or using different power source can also still be achieved with embodiments disclosed herein, as one or more slave charger devices can be used to achieve different total current levels sent to a battery. An additional advantage of certain embodiments disclosed herein is that slave and master charger devices can be set at similar or the same voltage float levels. In this way, both slave and master charger devices can be efficiently utilized during a constant voltage (CV) charging stage to maintain a voltage most desirable for a fast and efficient charge of a battery. Accordingly, the paralleling of multiple battery chargers as disclosed herein may allow for smaller packaging footprints, current sharing to distribute power load among various chargers devices, minimal setup and/or coordination of various master/slave devices, etc.

FIG. 1A shows a printed circuit board (PCB) 10 level battery charger in accordance with various embodiments. In particular, FIG. 1A shows a portion of a printed circuit board (PCB) 10 populated with battery charging devices in accordance with the present disclosure. The PCB 10 may be a circuit board, for example, in a mobile computing device, a smart phone, and in general any electronic device. The PCB 10 may be populated with battery charging devices 102, 102a, 102b. It will be appreciated in the discussions to follow that fewer or more battery charging devices may be provided. Each of the battery charging devices 102, 102a, 102b may be embodied in any suitable integrated circuit (IC) packaging format (e.g., single in-line packaging, dual in-line packaging, surface mount devices, and so on) and interconnected on the PCB 10.

In some embodiments, the battery charging devices 102, 102a, 102b are identical devices that can be configured for different modes of operation. For example, device 102 may be configured for master mode operation, while devices 102a, 102b may be configured for slave mode operation. It will be understood that battery charging devices 102, 102a, 102b may include pins or terminals (not shown) that allow the devices to be interconnected on the PCB 10 using PCB traces, represented generally by 12. In other embodiments, the slave charging devices (e.g., 102a and 102b) may be configured differently than a master charging device (e.g., 102). For example, as will be discussed in greater detail below, since slave charging devices have priority and may output a constant current, the slave charging devices may not have certain aspects of a feedback network. In addition, since an output signal of a slave device is not necessarily monitored at the slave device, certain control aspects of a slave device may also be omitted.

In accordance with principles of the present disclosure, the battery charging devices 102, 102a, 102b may be connected to a battery 22 via a connection 24 (e.g., battery terminal) for coordinated charging of the battery by the battery charging devices. The battery 22 may comprise any known configuration of one or more cells (e.g., a single-cell configuration, a multi-cell, multi-stack configuration, etc.) and may use any suitable chemistry that allows for recharging.

In some embodiments, the battery charging devices 102, 102a, 102b operate as buck converters, and in other embodiments the battery charging devices may comprise buck-boost converters. In some embodiments, the inductive component of buck converters may be provided as external inductive elements 14 provided on the PCB 10. Accordingly, each battery charging device 102, 102a, 102b may be connected to a corresponding external inductive element 14, such as an inductor. In this example, the inductive elements 14 are "external" in the sense that they are not part of the charging integrated circuits (ICs) that comprise the battery charging devices 102, 102a, 102b. In accordance with the present disclosure, a capacitive component of the buck converters may also be provided as external capacitive elements 16 on the PCB 10 for each battery charging device 102, 102a, 102b. The capacitive elements 16 are also considered "external" in this example, in the sense that they is not part of the charging ICs that comprise the battery charging devices 102, 102a, 102b. In other embodiments, one or both of the inductive elements 14 and the capacitive elements 16 may be implemented internal to their respective charging device 102-102b. In some embodiments, a pair of an inductive element 14 and a capacitive element 16 is labeled as a filter.

Further in accordance with embodiments disclosed herein, each battery charging device 102, 102a, 102b may be connected to a corresponding external selection indicator 18 to configure the device for master or slave mode operation. In this example, each selection indicator 18 is "external" in the sense that it is not part of the charging IC that comprises the device. In some embodiments, the selection indicator 18 may be a resistive element. For example, a connection to ground potential (e.g., approximately 0Ω) may serve to indicate the device (e.g., 102) should operate in master mode. A non-zero resistance value (e.g., 10KΩ, 100KΩ, etc.) may serve to indicate that the device (e.g., 102a, 102b) should operate in slave mode. More generally, in other embodiments, the selection indicator 18 may be a source of a suitable analog signal or digital signal that can serve to indicate to the device 102, 102a, 102b whether to operate in master mode or slave mode. In other embodiments, the selection indicators 18 may not be present. For example, the charger device 102 may be permanently configured to be a primary/master device, while the charger devices 102a and 102b are permanently configured to be slave/secondary charger devices. Thus, the circuitry utilized to specify a master or slave mode operation may be omitted from the PCB 10, further simplifying the system and its functions.

Power to the battery charging devices 102, 102a, 102b may be externally provided via any suitable connector 26. Merely as an example, the connector 26 may be a USB connector. Power from a VBUS line of a USB connector may be connected to device 102 (e.g., at a USBIN terminal), which may then distribute the power to the other devices 102a, 102b via a MIDUSBIN terminal. These and other terminals will be described in more detail below. In other embodiments, the VBUS line may be routed separately to one or more of the devices 102a and 102b.

The PCB 10, battery 22, and connector 26 may be implemented in any number of different devices. For example, the PCB 10, battery 22, and/or connector 26 may be implemented in a mobile device such as a mobile or cellular telephone, a tablet, a laptop, or a medical or wearable device. In some embodiments, the connector 26 is configured to receive power wirelessly.

Figure 1B:
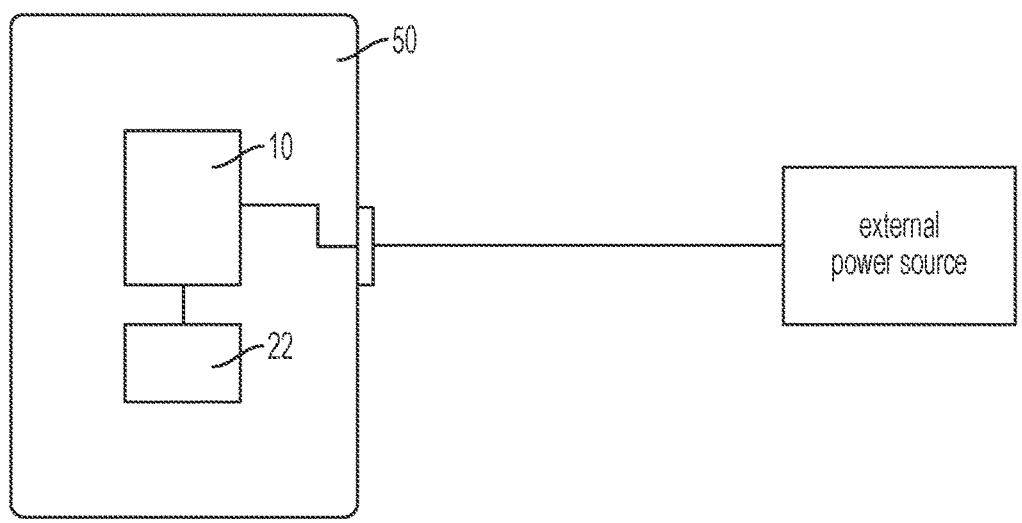
FIG. 1B shows an electronic device with a battery charger in accordance with various embodiments.
Figure 1C:
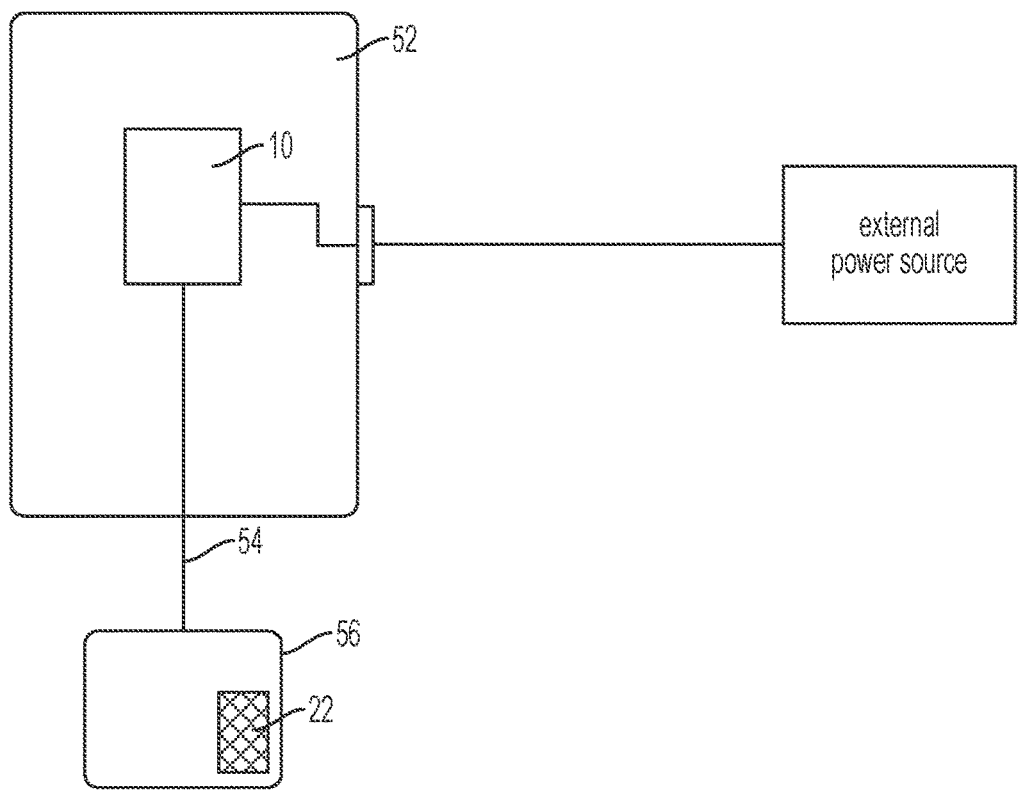
FIG. 1C shows a second electronic device with a battery charger in accordance with various embodiments.

FIG. 1B shows an electronic device 50 with a battery charger in accordance with various embodiments. FIG. 1C shows a second electronic device 52 with a battery charger in accordance with various embodiments. One of ordinary skill will appreciate that embodiments according to the present disclosure may include any electronic device. For example, FIG. 1B indicates that the PCB 10 may be incorporated in any electronic device 50 to charge battery 22. FIG. 1C illustrates another configuration in which PCB 10 may be provided in a first electronic device 52 that has a connection 54 to a second electronic device 56 to charge battery 22 in the second electronic device. In some embodiments, the connection 54 may not be physical, for example, wireless energy transfer from device 52 may be provided using magnetic induction circuitry (not shown).

Figure 2:
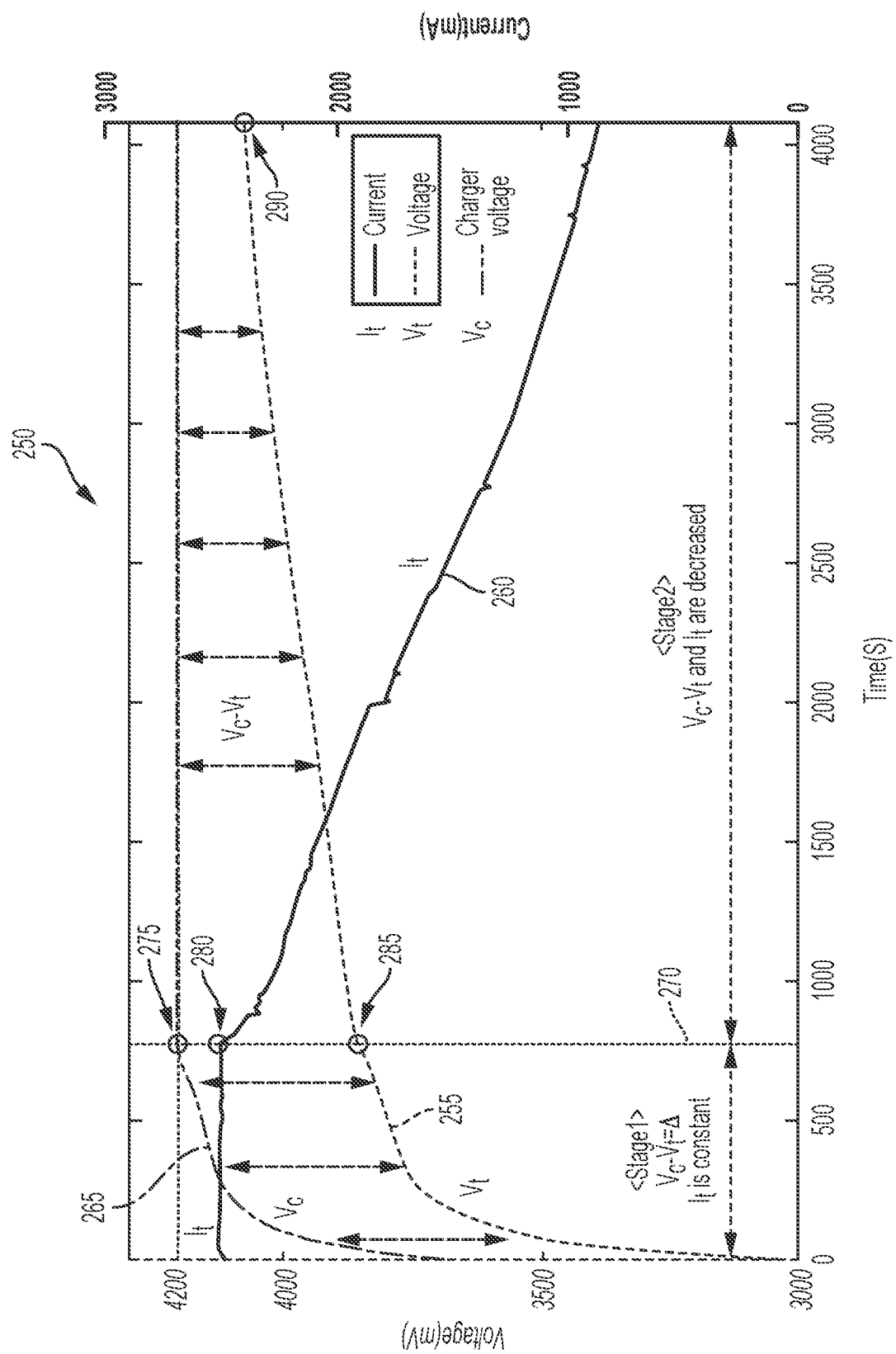
FIG. 2 illustrates a graph for a constant-current (CC)/constant-voltage (CV) battery charging method in accordance with various embodiments.

FIG. 2 illustrates a graph 250 for a constant-current (CC)/constant-voltage (CV) battery charging method in accordance with various embodiments. The graph 250 includes a current line 260, a charger voltage line 265, and a battery voltage line 255. The current line 260 indicates the level of current flowing through the battery terminal over time from the charging devices. The charger voltage line 265 illustrates the voltage applied to the battery over time as the battery is charged. The battery voltage line 255 illustrates the voltage of the battery over time as the battery is charged.

In a first stage of the charging, a constant current mode, the current applied to the battery is constant and high, as shown by the current line 265. This helps the battery charge quickly initially before dialing back the current in the second stage of charging. Once the voltage of the battery as shown by the battery voltage line 255 reaches a point 285, the second stage of charging commences. In one example, the point 285 represents a particular state of charge (SOC) at which it is more efficient to charge the battery at a lower current. In this example, the point 285 is at a 20% SOC. A point 290 demonstrates when a battery is at an 80% SOC. A point 280 demonstrates a current turning point as the current applied to the battery is reduced in the second stage. A point 275 shows the max cutoff voltage, where in stage two the voltage applied to the battery is held constant at a high level despite a decrease in current applied. The graph 250 further shows a delta voltage between the battery voltage and voltage applied by the charging devices decreases over time along with the current, as the battery slowly gets charged. Various embodiments disclosed herein can be used to implement efficient CC-CV charging methods.

Figure 3:
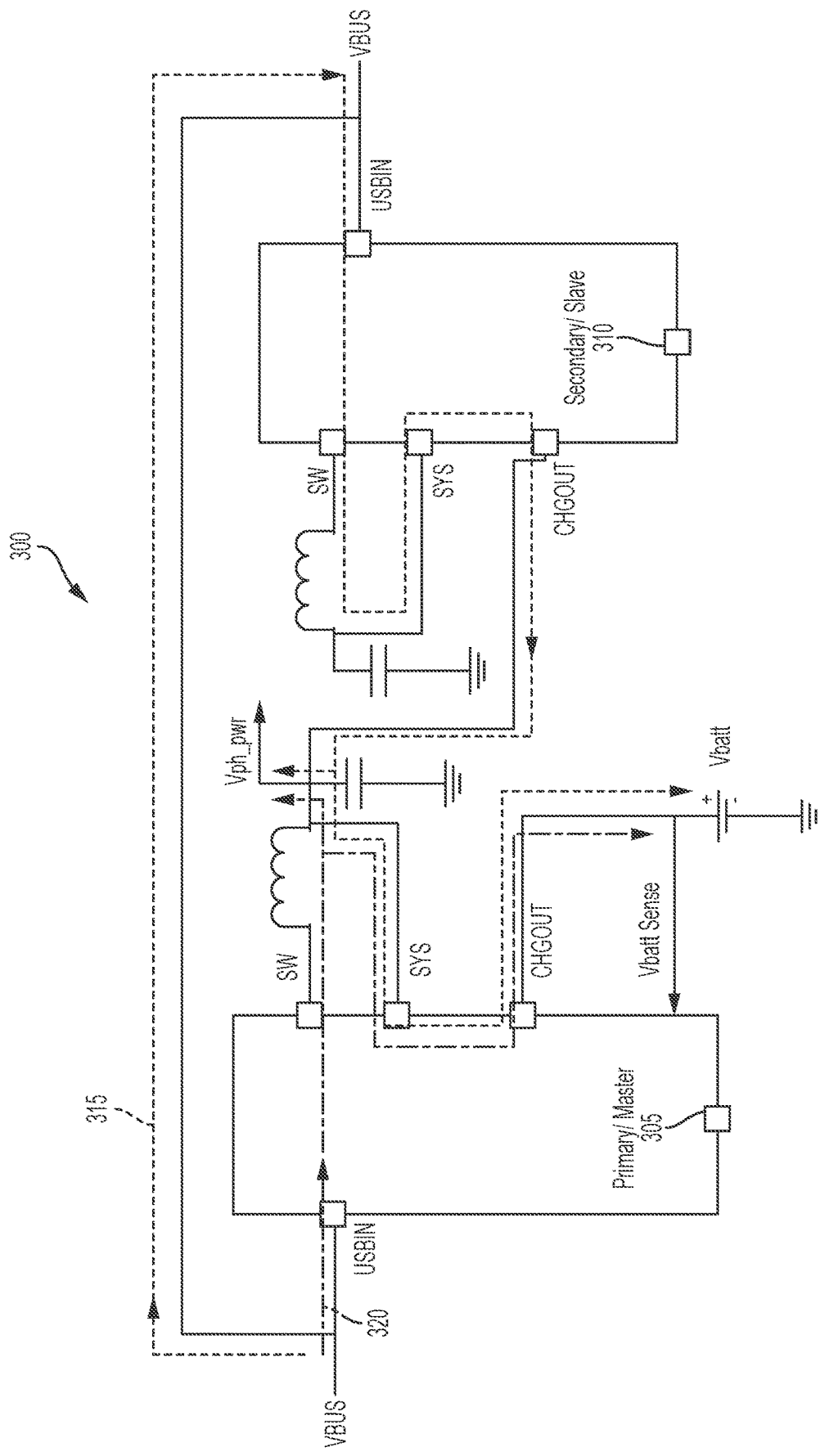
FIG. 3 illustrates current paths of two charging devices utilized in accordance with various embodiments.

FIG. 3 illustrates current paths of two charging devices utilized in accordance with various embodiments. In particular, FIG. 3 includes a primary/master charging device 305 and a secondary/slave charging device 310. A voltage bus (VBUS) supplies power to the charging devices 305 and 310. Thus current 320 for the primary flows from the VBUS to the USBIN of the charging device 305. The current is then passed out of the charging device 305 through a switching circuit SW to an inductance. As will be discussed below further, the switching circuit controls the output of the charging device 305. The current can then pass to Vph_pwr (i.e., power inputs for the device whose battery is being charged) as well as back to a SYS input of the charging device 305. The Vph_pwr allows a mobile device to function and be powered even if the battery of the mobile device is dead.

As will be discussed further below, while in the charging device 305 after passing through the circuit SW, the current signal 320 passes through a current sense element such as a FET. This allows the charging device 305 the ability to monitor the current being output by it and adjust the output based on feedback from the current sense element. The current is then output to a battery terminal to charge the battery. The battery here is represented by the voltage Vbatt. The system here also includes a Vbatt sense, which allows the system to monitor the voltage of the battery (as well as potentially other parameters of the battery). For example, the system can monitor for the voltage of the battery at which to switch to a constant voltage (CV) mode in a charging method, as described above with respect to FIG. 2.

A current path 315 shows a current path for the secondary/slave charging device 310. The current passes from the VBUS to a USBIN of the charging device 310 and out a switching circuit. The current then comes back into the charging device 310 and is output and combined with the current of the charging device 305. In particular, the current is combined such that the current path 315 of the charging device 305 passes through the charging device 305, such that the total current being sent to the battery may be sensed by the charging device. Further details on how the charging devices disclosed herein sense the total current are included below.

In this way, the charging device 305 can determine when the output to the battery needs to or should be adjusted. The charging device 305 can then utilize its own switching circuit to modify the total output to the battery. Although the charging device 305 may not adjust the output from the charging device 310, the charging device 305 can take the output from the other charging device 310 into account, thus achieving a desired result. In other embodiments, the charging device 305 may control to some or great extent the output of the charging device 310. In such an embodiment, the charging device 310 can still monitor the total output to the battery and make changes to its own output or order a change to output of a slave as desired.

Figure 4:
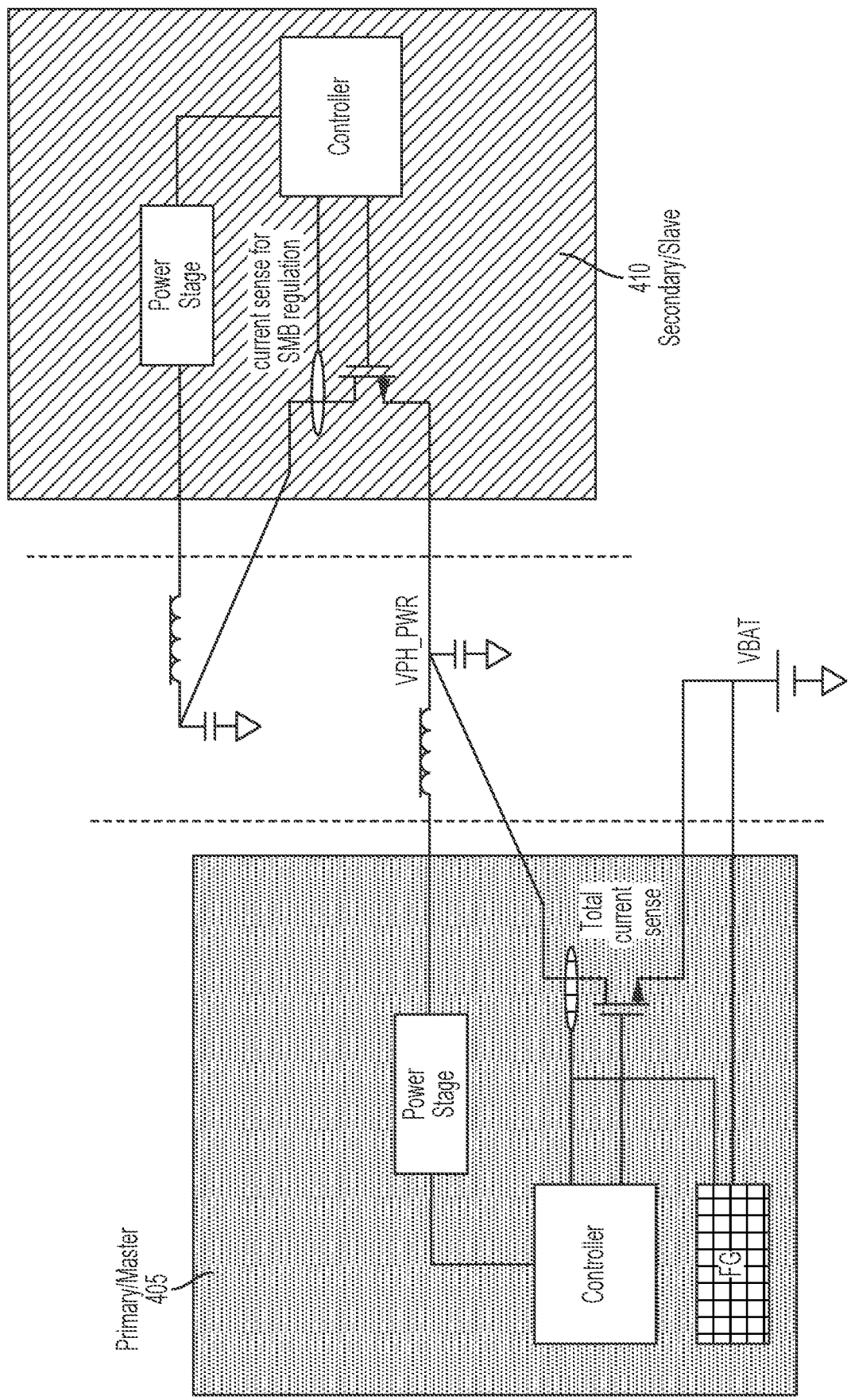
FIG. 4 illustrates generally internal components of two charging devices utilized in accordance with various embodiments.

FIG. 4 illustrates generally internal components of two charging devices 405 and 410 utilized in accordance with various embodiments. The charging devices 405 and 410 may be similar to the charging devices 305 and 310 discussed above, but FIG. 4 illustrates additional internal components. In particular, each of the charging devices 405 and 410 include a power stage that outputs a signal for charging a battery. The power stage can include a switching circuit as disclosed herein and can be controlled by a controller. The controller can further control a FET of each charging device 405 and 410, where the charging devices' outputs can be turned on or off. Additionally, a current sense element can exist with or including the FET. In this way, the charging device 405 can sense the total current of the system being output to the battery, and the charging device 410 can sense the total current being output by the charging device 410. Additionally, the charging device 405 includes feedback elements FG that can monitor aspects of the battery such as voltage (VBAT) and the total current being output, and send feedback to the controller of the charging device 405 so that the system can be adequately adjusted/controlled as desired. In the embodiment illustrated in FIG. 4, devices 405 and 410 illustrated on the outside of the dotted lines are implemented in separate devices or chips, while the elements illustrated between the dotted lines are implemented external to the devices 405 and 410, for example on a PCB to which the devices 405 and 410 are coupled as discussed with respect to FIG. 1. In some embodiments, the devices 405 and 410 are implemented on the same chip, but are configured as different chargers. In such embodiments, the elements between the dotted lines may be implemented external to the chip, or may be implemented on the chip.

Figure 5:
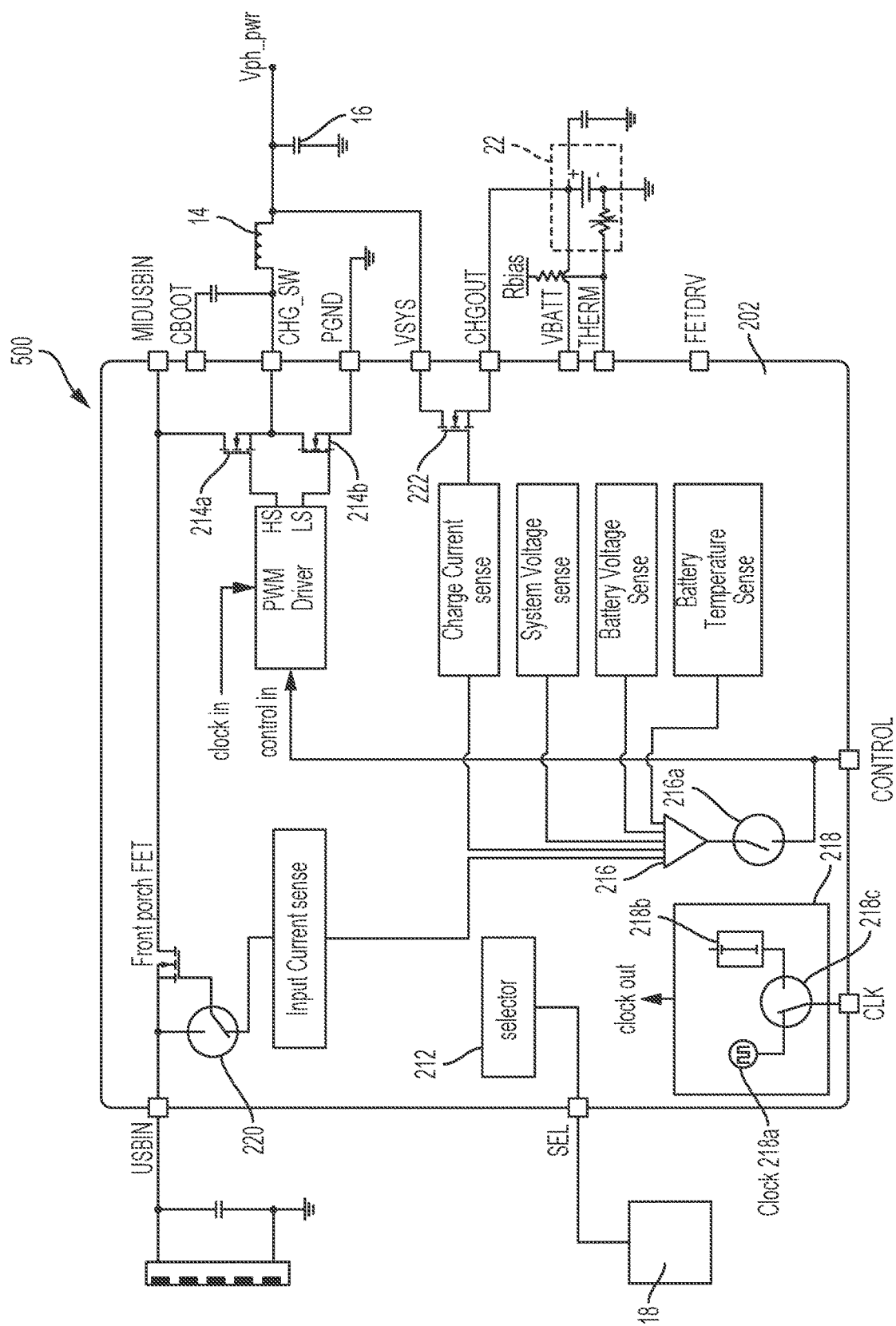
FIG. 5 illustrates a general view of a charging circuit in accordance with various embodiments.

FIG. 5 illustrates a detailed view of a charging circuit 500 in accordance with various embodiments. The charging circuit 500 may be used as a charging device such as those shown in FIGS. 1A-1C, 3, and 4. FIG. 5 shows a simplified schematic representation of a battery charging device 102 of FIG. 1, for example. In some embodiments, the battery charging device 102 may comprise a charging integrated circuit (IC) 202. It will be appreciated that in some implementations, the design of the charging IC may be implemented on two or more ICs.

The charging IC 202 may comprise circuitry to provide battery charging functionality in accordance with principles of the present disclosure. In some embodiments, for example, the battery charging functionality may be provided using a buck converter, or a buck-boost converter, and so on. Accordingly, the charging IC 202 may include a high-side (HS) FET 214a and a low-side (LS) FET 214b that can be configured in a buck converter topology in conjunction with inductive element 14 and capacitive element 16. In some embodiments, the FETs 214a and 214b are configured as a switching regulator or converter, for example in combination with a pulse width modulated (PWM) driver circuit.

The PWM driver circuit may produce gate drive signals (HS, LS) at its switching output to switch the gates of respective FETs 214a and 214b. The PWM driver circuit may receive a current-mode control signal at its control input and a clock signal at its clock input to control the switching of FETs 214a and 214b. Power (Vph_pwr) from the buck converter may be connected to charge the battery 22 through battery FET 222 via the VSYS and CHGOUT terminals of the charging IC 202. The battery FET 222 may serve to monitor the charge current (e.g., using a charge current sense circuit). In some embodiments, an element separate from the FET 222 is implemented between VSYS and CHGOUT to sense or monitor the charge current. In some embodiments, the charge current is sensed with a resistor or other device or element.

In accordance with principles of the present disclosure, the control signal may be internally generated within the charging IC 202 or externally provided to the charging IC. For example, a feedback compensation network comprising various feedback control loops and a comparator 216 may serve as a source of an internally generated control signal. In a particular embodiment, the feedback control loops may include an input current sense circuit (e.g., senses input current at USBIN), a charge current sense circuit (e.g., senses current at VSYS and CHGOUT terminals using battery FET 222 or another element as described above), a system voltage sense circuit (e.g., senses voltage at VSYS terminal), a battery voltage sense circuit (e.g., senses battery voltage at VBATT terminal), and a battery temperature sense circuit (e.g., senses battery temperature at THERM terminal). In other embodiments, the feedback control loops may comprise fewer, or additional, sense circuits. The comparator 216 may produce a reference that serves as the internally generated control signal. The charging IC 202 may change a power source output based on any of these feedback control loops.

The control signal produced by comparator 216 is "internal" in the sense that the control signal is generated by circuitry that comprises the charging IC 202. By comparison, a control signal is considered to be "externally" provided when the signal is received from a source external to the charging IC 202; e.g., via a CONTROL terminal of the charging IC 202. In some embodiments, a control selector 216a may be provided to select either the internal control signal generated by the comparator 216 or an externally generated control signal received on the CONTROL terminal to serve as the control signal for the PWM driver circuit.

The clock signal may be internally generated within the charging IC 202 or externally provided to the charging IC. For example, the charging IC 202 may include a clock generator 218 to produce a clock signal (clock out). The clock generator 218 may include a clock generating circuit 218a and a delay element 218b. The clock generating circuit 218a may produce a clock signal that serves as an internally generated clock signal. The delay element 218b may receive an externally provided clock signal.

The clock signal produced by the clock generating circuit 218a is "internal" in the sense that the clock signal is generated by circuitry that comprise the charging IC 202, namely the clock generating circuit. By comparison, a clock signal is considered to be "externally" provided when the signal is received from a source external to the charging IC 202; e.g., via the CLK terminal of the charging IC. In some embodiments, a clock selector 218c may be provided to select either the internal clock signal generated by the clock generating circuit 218a or an external clock signal provided on the CLK terminal and delayed (phase shifted) by the delay element 218b to serve as the clock signal for the PWM driver circuit. In some embodiments, one of the CLK terminal and the clock generator 218 is omitted.

The charging IC 202 may also include a selector circuit 212 to configure the charging IC to operate in a master mode or slave mode according to the external selection indicator 18 provided on an SEL input of the charging IC. In other embodiments as disclosed herein, the selector logic may not be present. For example, the charging IC 202 could be configured to permanently be a master charging IC. The selection indicator 18 may be a circuit, or a source of an analog signal (e.g., an analog signal generator) or a digital signal (e.g., digital logic). In some embodiments, for example, the selection indicator 18 may be an electrical connection to ground potential, either directly or through a resistive element. The selector circuit 212 may operate the control selector 216a and the clock selector 218c according to the selection indicator 18. The selector circuit 212 may also operate a switch 220 to enable or disable sensing of the current input in accordance with the selection indicator 18.

The IC 202 shows a general charger device that may be used in any of the disclosed embodiments herein as a slave or master device. The charger devices disclosed herein may also have similar, different, more, or less elements that that shown and discussed with regard to the IC 202 of FIG. 5.

Figure 6A:
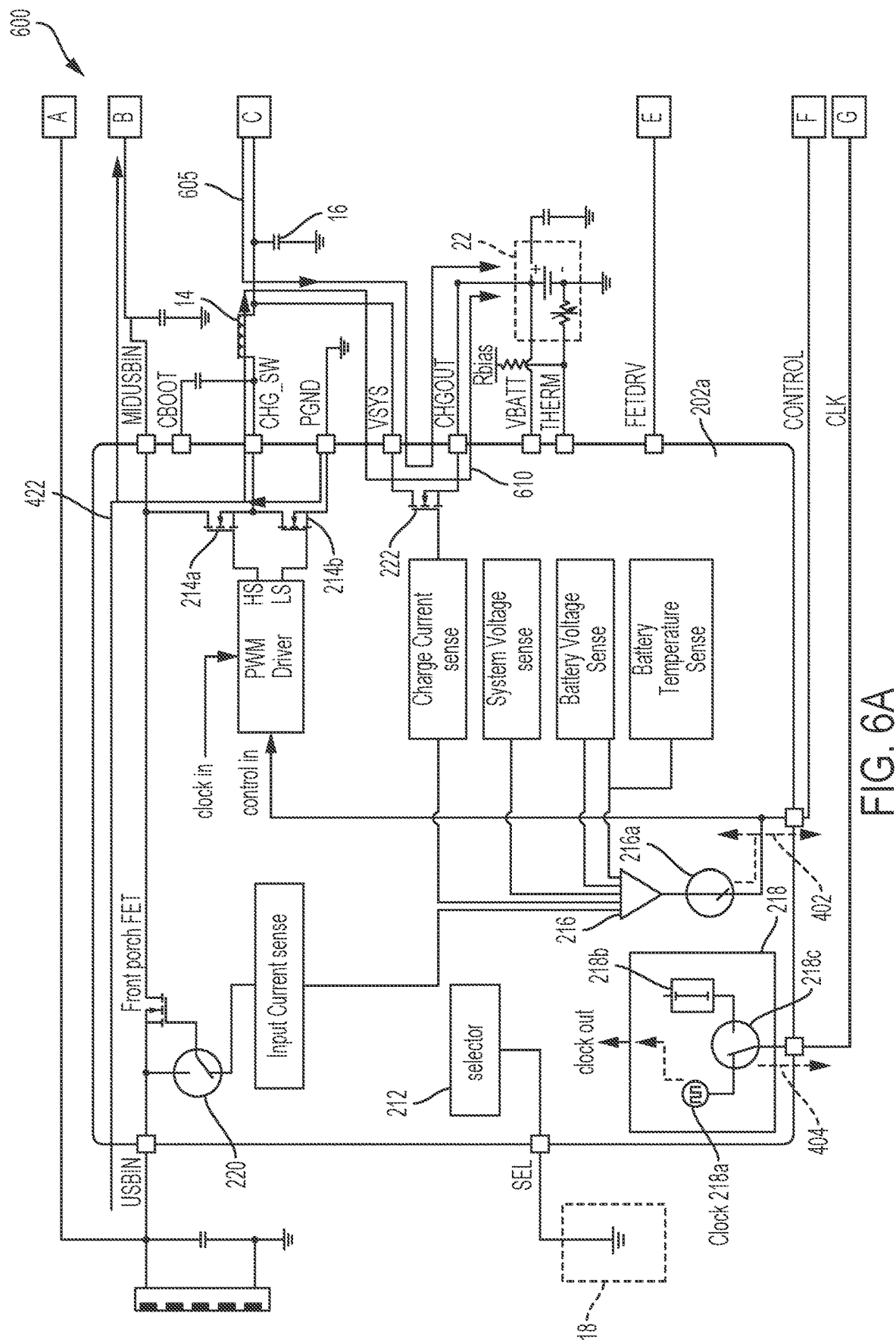
FIGS. 6A and 6B illustrate a specific example of utilizing two charging devices in accordance with various embodiments.
Figure 6B:
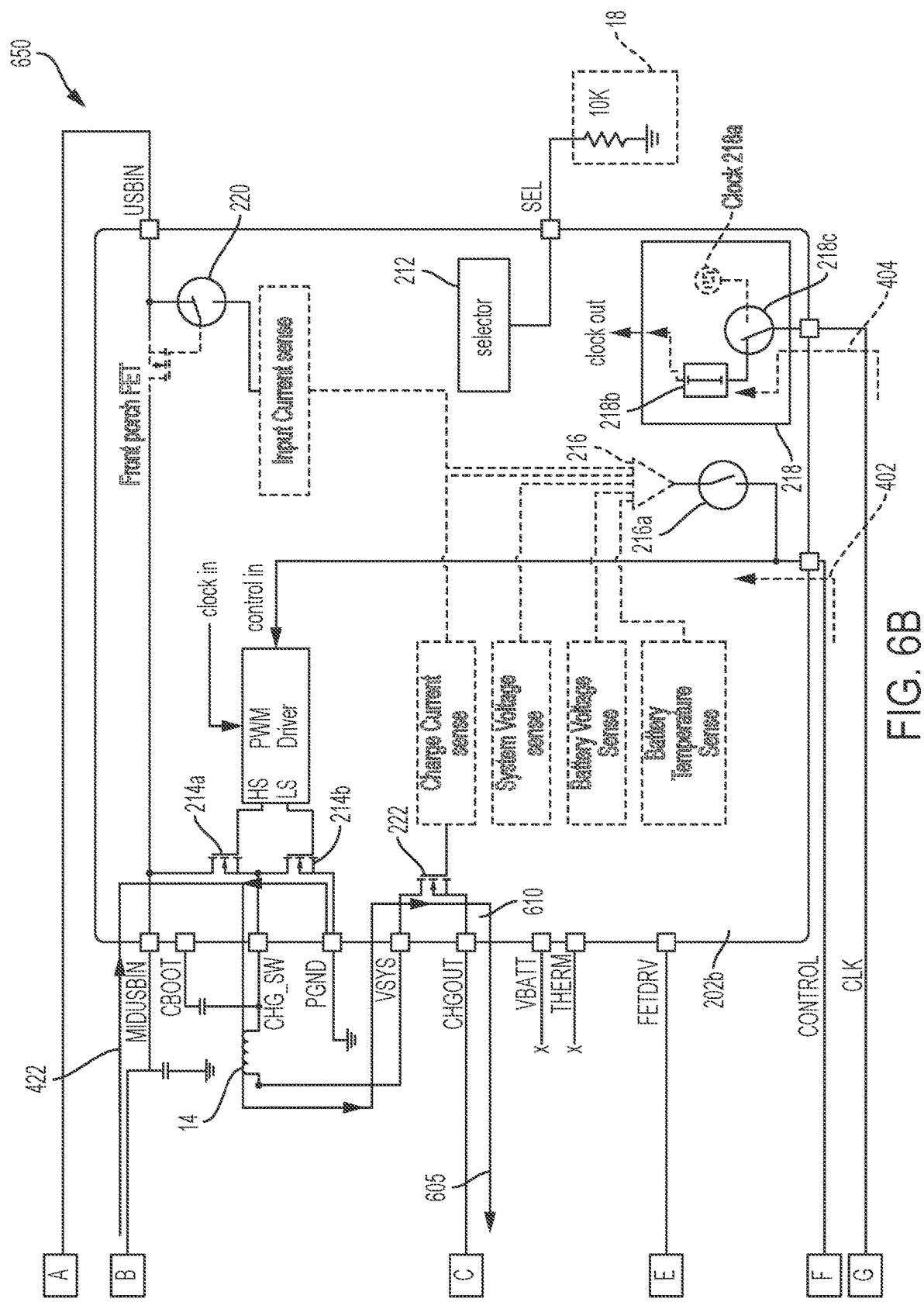

FIGS. 6A and 6B illustrate a specific example of utilizing two charging devices 202a and 202b in accordance with various embodiments. The two charging ICs 202a and 202b are connected and operate together to charge a battery 22. One of the charging ICs 202 may be configured as a master device and the other as a slave device. Here, the IC 202a is configured as the master device and the IC 202b is configured as the slave device. The charging ICs 202a, 202b are connected together at connections A, B, C, E, F, and G. The resulting current flow is illustrated in FIGS. 6A and 6B as flows 422, 605, and 610. In particular, current flow 422 shows the input power to each of the charging devices, current flow 605 shows the slave side current flow, and current flow 610 shows the master side current flow. The slave and master side current flows are similar to those shown and discussed with respect to FIG. 3 above.

In particular, the current flow 610 shows that from the input current flow 422, the switching circuitry (made up of the PWM driver and FETs 214a and 214b) can output a signal that passes through the inductance 14, the FET 222, and is output to the battery 22. The current flow 605 shows that the charging IC 202b outputs from its switching circuitry a signal that passes through its inductance 14, FET 222, and out to connection C. At connection C the current flow 605 from the secondary/slave charging IC 202b is combined with the current flow 610 and input through VSYS, the FET 222 of the charging IC 202a, the CHGOUT terminal, and eventually to the battery 22. In various additional embodiments, more slave charging ICs may be added and their outputs also may be combined at connection C. As disclosed herein, passing both the current flows 605 and 610 through the FET 222 or other current sense element of the charging IC 202a allows the charging IC 202a to sense the total current being passed to the battery 22, and therefore adjust (with its switching circuitry) the current output as current flow 610 to achieve a desired current flow, while still taking advantage of the benefits offered by utilizing multiple chargers. The current flow 605 may be of a constant current and/or a constant voltage. In various embodiments, this will make charging methods such as the CC-CV method practical to achieve. In particular, the current flow 605 may be a constant current during a CC stage without utilizing any software or controls on the slave charging IC. Similarly, the CV stage may be managed efficiently by setting a voltage float (VFLT) for the slave charging IC at a desired level or controlling the slave charging IC to a certain voltage level as disclosed herein. In another embodiment, the slave may not be controlled at all and will maintain a similar voltage that is kept by the primary. The system is able to accomplish all this without having extensive controls of the slave charging IC 202b or extensive set up or configuration for the slave charging IC 202b. However, certain controls and setup of the slave charging IC 202b are possible, and some of those embodiments are discussed briefly below.

The charging IC 202a shown in FIG. 6A is configured for master mode operation. In accordance with the present disclosure, the control signal generated by the comparator 216 in charging IC 202a is provided as an externally generated control signal 402 (e.g., via the CONTROL terminal), in addition to serving as an internally generated control signal for the PWM driver circuit in the charging IC. In other embodiments, the control signal may be generated internally. In other embodiments, the charging IC 202a may be permanently configured as a master charging device and may not have any of these particular control signal components or terminals. Similarly, the clock signal generated by the clock generator 218 is provided as an externally generated clock signal 404 (e.g., via the CLK terminal), in addition to serving as an internally generated clock signal for the PWM driver circuit in the charging IC 202a. Similarly, in other embodiments, the clock signal may be generated internally.

Referring to FIG. 6B, the charging IC 202b is configured for slave mode operation. The charging IC 202b may be configured using the SEL input to operate in slave mode. In some embodiments, slave mode operation may be designated by a selection indicator 18 that comprises a resistive element. This convention for designating slave mode operation will be used for the remainder of the disclosure with the understanding that, in other embodiments, other conventions may be adopted to indicate slave mode operation. In a particular embodiment, for example, a 10K resistor may be used to indicate slave mode operation. It will be appreciated, of course, that another resistance value may be used. The selector 212 may be configured to respond to the detection of a 10KΩ resistance at the SEL input by configuring the charging IC 202b for slave mode operation. In other embodiments, the charging IC 202b may not have any selection inputs or components, and instead may be designed to merely operate and output a current, since the master charging devices disclosed herein can monitor total current and adjust their own output accordingly.

In slave mode operation, the selector 212 may operate the control selector 216a in a second configuration to receive the externally generated control signal 402 that is received on the CONTROL terminal of the charging IC 202b. The control selector 216a provides the externally generated control signal 402 to the control input of the PWM driver circuit. Operation of the control selector 216a in the second configuration disconnects or otherwise effectively disables the feedback network in charging IC 202b from the PWM driver circuit. This disconnection is emphasized in the figure by illustrating the elements of the feedback network in charging IC 202b using broken grayed out lines. In another embodiment, the internal connections may be utilized. In other embodiments, the feedback network is omitted.

The selector 212 in charging IC 202b may also operate the clock selector 218c in a second configuration to receive the externally generated clock signal 404 on the CLK terminal. The clock selector 218c provides the externally generated clock signal 404 to the delay element 218b. The clock signal that is provided to the PWM driver circuit comes from the delay element 218b, thus disconnecting or otherwise effectively disabling the clock generating circuit 218a in the charging IC 202b. In various other embodiments, the charging IC 202 may not have selector circuitry and may always function as a slave or the clock generator 218 may be omitted.

Switch 220 may be configured (e.g., by selector 212) to disable current sensing at the USBIN terminal of charging IC 202b. Power to the high- and low-side FETs 214a, 214b may be provided by the MIDUSBIN terminal via connection B. In another embodiment, power to the high- and low-side FETs 214a and 214b can also be provided by the USBIN terminal via connection A. Similarly, charge current sensing in the slave-configured charging IC 202b may be disabled. In some embodiments this includes disabling the battery FET 222. While not illustrated in FIG. 6B, a capacitor or other capacitive element may be coupled between the inductive element 14 and ground.

As can be appreciated from the foregoing description, operation of the PWM driver circuit in the slave-mode charging IC 202b may be controlled by the control signal and clock signal that is generated in the master-mode charging IC 202a and provided to the slave-mode charging IC 202b respectively as externally generated control and clock signals 402, 404. From the point of view of the slave-mode charging IC 202b, the control and clock signals generated in the master-mode charging IC 202a are deemed to be externally generated. However, this is merely one configuration in which the disclosed embodiments may function. For example, since in some embodiments the master charging IC 202a can sense and control the total current being passed to the battery, the master IC 202a need not send clock or control signals to the slave device. Instead, the IC 202a can merely adjust its own output to achieve a desired total sum output of IC 202a and 202b.

The master-mode charging IC 202a may optionally synchronize with the slave-mode charging IC 202b by asserting a signal on the FETDRV terminal. For example, when the master-mode charging IC 202a pulls the FETDRV terminal LO, the PWM driver circuit in the slave-mode charging IC 202b is disabled. When the master-mode charging IC 202a switches the FETDRV terminal to a high (HI) signal, the PWM driver circuit in the slave-mode charging IC 202b begins switching.

A delay element 218b may be configured (e.g., by selector 212) to provide a selectable phase shift that is suitable for dual-phase operation. For example, the delay element 218b may provide a 180° phase shift of the externally generated clock signal 404. Accordingly, the clock signal that is provided to the clock input of the PWM driver circuit in the slave-mode charging IC 202b is 180° out of phase relative to the clock signal in the master-mode charging IC 202a. Consequently, the charging cycle of the master-mode charging IC 202a will be 180° out of phase relative to the charging cycle of the slave-mode charging IC 202b. For example, when the high-side FET 214a is ON in the master device, the high-side FET in the slave device is OFF, and vice-versa.

In some embodiments as disclosed herein, a charging IC (e.g. the charging IC 202b of FIG. 6B) may be implemented as a slave-only device. Such slave-only devices may have much fewer components than a master device. For example, a charging IC may receive only an externally generated control signals (e.g., from the CONTROL terminal), clock signals (e.g., from the CLK terminal), etc., such that the elements used to internally generated such signals may not be included in a charging IC device. Since the control signal and clock signal may be externally generated, the slave-only charging IC can omit circuitry comprising a feedback network and clock. Likewise, a slave-only charging IC could omit an input (front porch) FET and battery FET, since the device does not need to sense the input current. This can be advantageous in terms of a smaller device and/or a lower cost device, especially since the input (front porch) and battery FETs are power FETs which can occupy significant areas on a die. Implementing devices 202a and 202b using similar elements instead of omitting elements from device 202b may be advantageous, however, in certain circumstances in that any number of charging devices may be coupled in any number of configurations without requiring individual production or configuration of differentiated devices. FIG. 6B additionally shows using dashed and greyed out lines some of the components of a charging device that may be omitted for some charging ICs.

In some embodiments, a slave-only charging IC may include additional circuitry to enhance performance. Though not illustrated, for example, a slave-only charging IC may include inductor current sense circuitry for peak current limiting. As another example, a slave-only charging IC may additionally include a thermal loop to ensure the junction temperature does not exceed a maximum operating limit.

Figure 7:
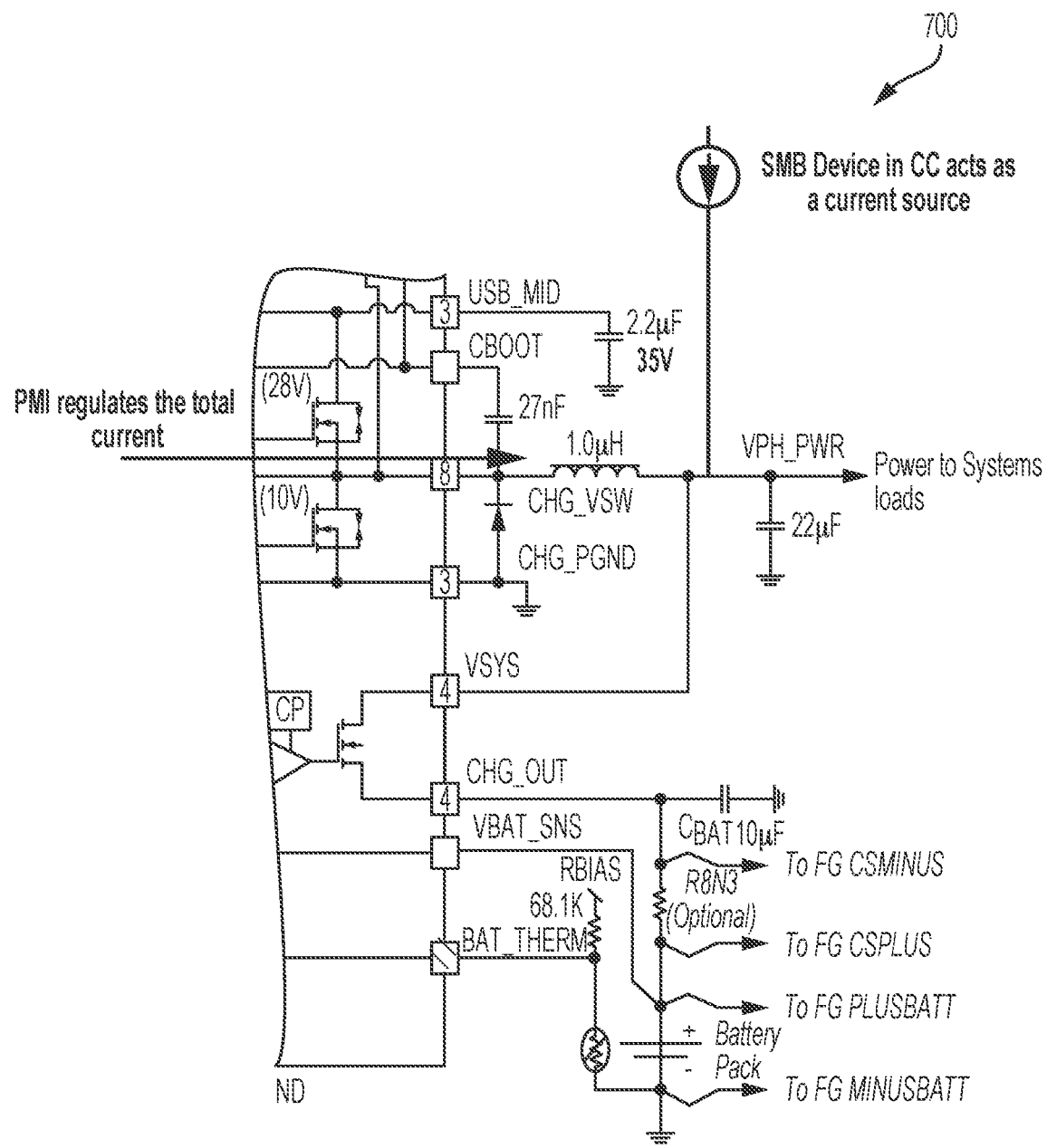
FIG. 7 shows a close-up detail of a specific example of utilizing two charging devices in accordance with various embodiments.

FIG. 7 shows a close-up detail of a specific example of utilizing two charging devices in accordance with various embodiments. FIG. 7 is included to better demonstrate a relationship between two charger devices such as those shown and discussed above with respect to FIGS. 6A and 6B.

In particular, FIG. 7 shows that a primary or master charging device (PMI) regulates the total current output to a battery at a switching circuit having two FETs. A secondary or slave charging device (SMB) acts as a current source whose current is combined with the current from the master charging device at the VSYS terminal/node. That combined current is then sent to a battery for charging of the battery. FIG. 7 also shows additional elements relevant to the present disclosure. Before the current reaches the battery, it may pass through an Rsns resistance. This external sense resistance may be used to measure the amount of current actually being passed to the battery. However, because the total current is already passing through the battery FET (or other internal current sense element) of the primary charging device, the primary charging device can measure the total current and the Rsns resistance may be omitted. Omitting such an element may save significant space and cost with respect to manufacturing the chargers disclosed herein. Additionally, FIG. 7 shows the current from the slave charging device as merely a current source. As will be understood by one of skill in the art, any current source could be used as a slave charging device in some embodiments. The configuration of a current source as a slave charging device is not limited to the configurations and specific examples presented herein. Because the primary/master charging device does all the adjusting based on the progress of a charging battery in some embodiments, the specific configuration of the current source may vary without affecting the functioning of the primary/master charging device (as long as the current source does not damage the system or otherwise cause the system to malfunction; e.g., as long as the current source is rated and/or sized properly). FIG. 7 also shows a VPH_PWR that represents power to system loads, or discrete components including but not limited to regulators, clocks, and discrete integrated circuits (IC's).

Figure 8:
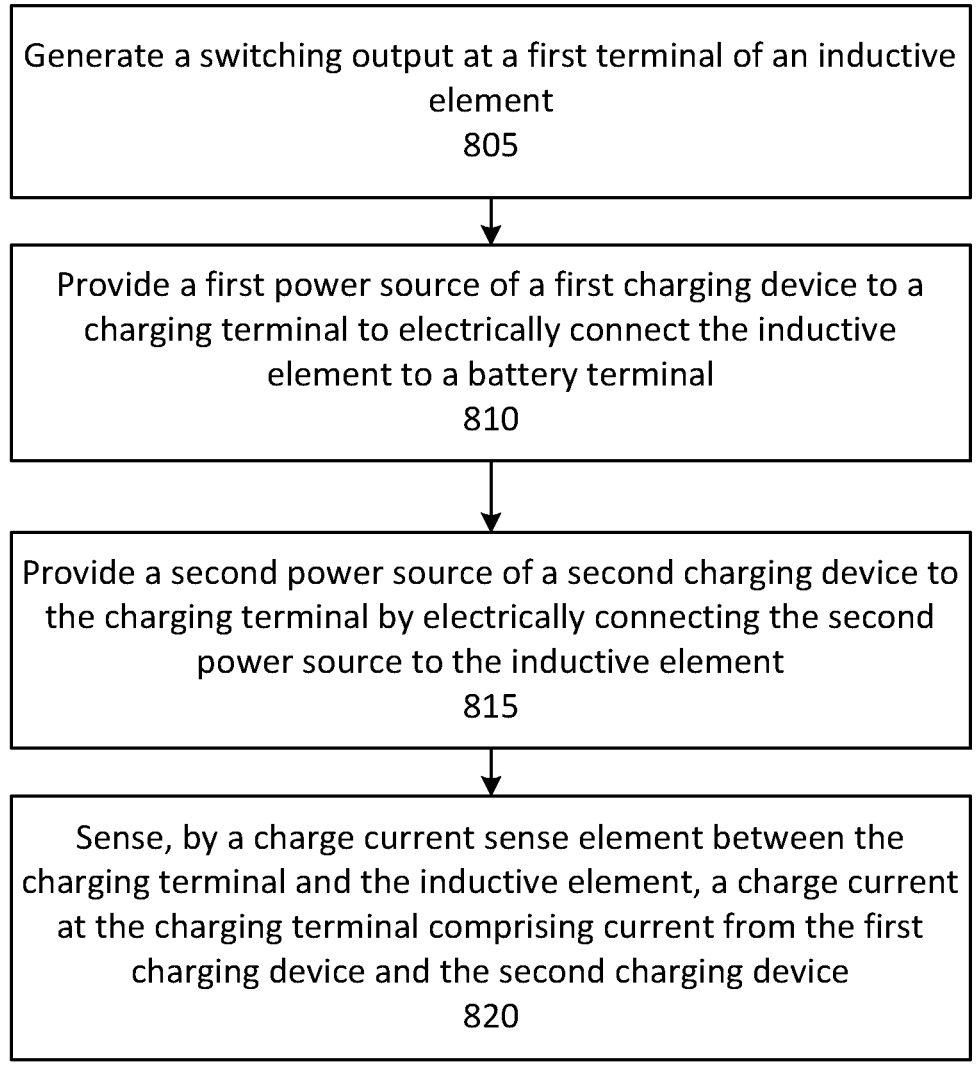
FIG. 8 is a flow diagram depicting a method for sensing combined signals from two charging devices.

FIG. 8 is a flow diagram depicting a method for sensing combined signals from two charging devices before sending the signals to a battery in accordance with various embodiments. In an operation 805, a system generates a switching output at a first terminal of an inductive element. The switching output may be from a switching circuit, such as the PWM driver and FETs 214a and 214b of FIG. 5. In an operation 810, the system provides a first power source of a first charging device to a charging terminal to electrically connect a second terminal of the inductive element to a battery terminal. For example, a signal may be conveyed from the second terminal of the inductive element through one or more elements in the first charging device (for example, a current sense element) to the charging terminal. The first power source charges a battery connected to the battery terminal. This first power source may be, for example, the current from a primary/master charging IC as disclosed herein (e.g., the primary device 305 of FIG. 3, the charging IC 202a of FIG. 6A).

In an operation 815, the system provides a second power source of a second charging device to the charging terminal by electrically connecting the second power source to the second terminal of the inductive element. For example, a signal may be conveyed from the FETs 214a and 214b or otherwise output from the charge output (e.g., CHGOUT) of the second charging device to the second terminal of the inductive element. The second power source also charges the battery connected to the battery terminal. This second power source may be, for example, the current from a secondary/slave charging IC as disclosed herein (e.g., the secondary device 310 of FIG. 3, the charging IC 202b of FIG. 6B). In an operation 820, the system senses, by a charge current sense element between the charging terminal and the second terminal of the inductive element, a charge current at the charging terminal comprising current from the first charging device and the second charging device. Here, a sensing element such as the FET 222 of FIG. 6A is used to sense the combined current from the first and second power sources as disclosed herein. Other current sense elements (e.g., a resistor) may also be utilized. In this way, the current from both the first and the second charging devices can be monitored by the sensing element of the first charging device. As disclosed herein, the first charging device can then adjust its output to adjust the output to a battery terminal without the use of external sensing components or having to control the second charging device.

Figure 9:
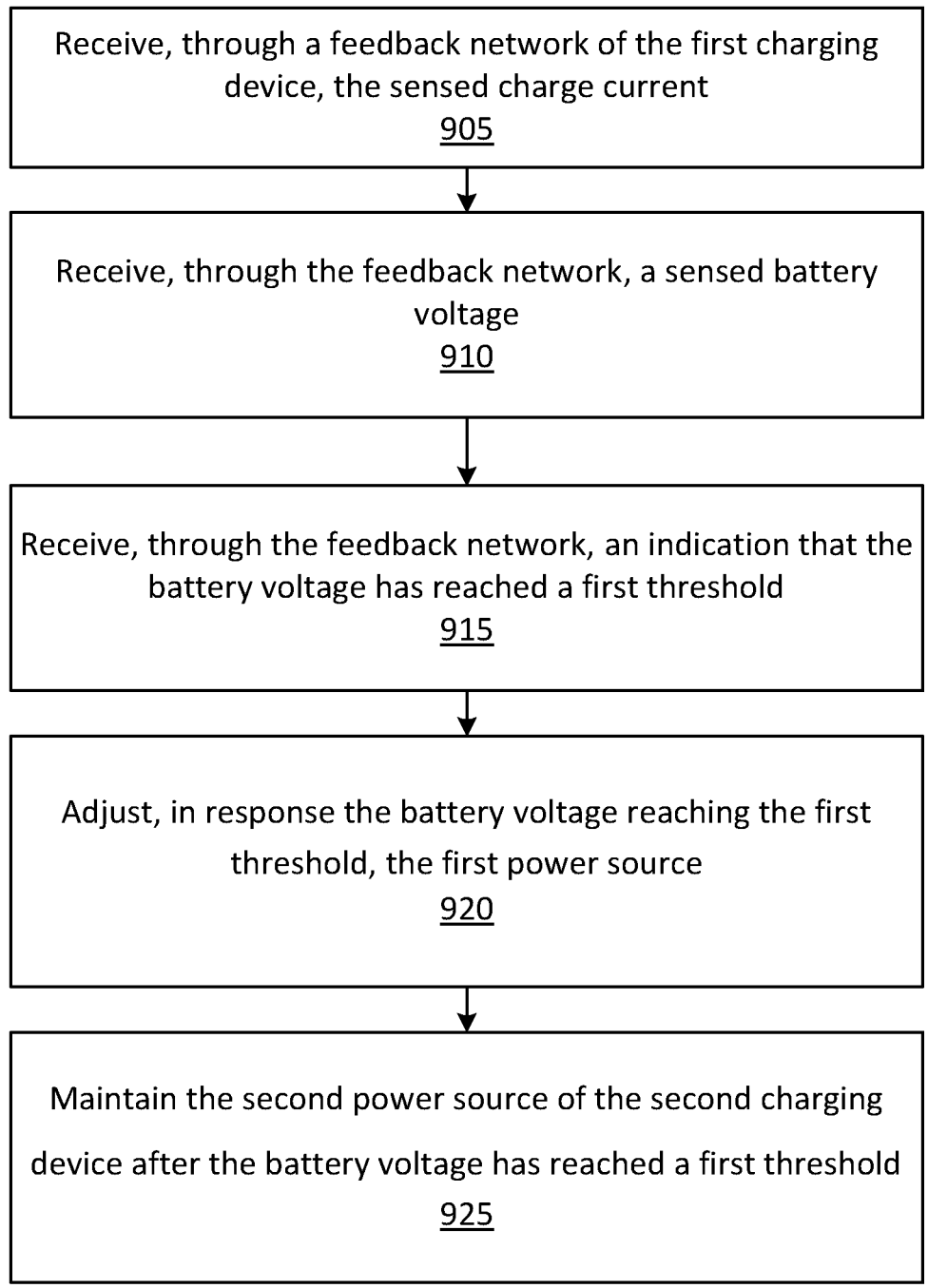
FIG. 9 is a flow diagram depicting a method for adjusting a power source based on a battery voltage reaching a threshold in accordance with various embodiments.

FIG. 9 is a flow diagram depicting a method for adjusting a power source based on a battery voltage reaching a threshold in accordance with various embodiments. In some embodiments, the method of FIG. 9 may be implemented in combination with the method illustrated in FIG. 8. In an operation 905, the system receives, through a feedback network of the first charging device, the charge current sensed at the charge current sense element. The charge current sense element may be, for example, the FET 222 of FIG. 6A or another sense element. In an operation 910, the system receives, through the feedback network, a battery voltage sensed at a battery voltage sense element. The battery voltage may be sensed via, for example, the VBATT terminal of the charging IC 202a of FIG. 6A (see, also, FIG. 4 as an example).

In an operation 915, the system receives, through the feedback network, an indication that the battery voltage has reached a first threshold. Here, the first threshold may indicate, for example, that the point 285 of FIG. 2 has been reached and the second stage (constant voltage) of a charging method is to commence. Thus, in an operation 920, the system adjusts, in response the battery voltage reaching the first threshold, the first power source. In the example of FIG. 2, the system would adjust the first power source to reduce the current output of the charging devices to the battery but maintain a voltage level output to the battery. In an operation 925, the system maintains the second power source of the second charging device after the battery voltage has reached a first threshold. For example, aspects (e.g., output current and/or voltage, or total output power) of the second power source from the slave/secondary charging device do not change as the primary/master charging device senses the total current output and adjusts its own power output. In this way, the cost, resource, and space savings may be realized at least in part because the total output can be sensed without external sensing elements and no controlling of the slave/secondary charger necessarily needs to be performed (although it can optionally be performed).

Figure 10:
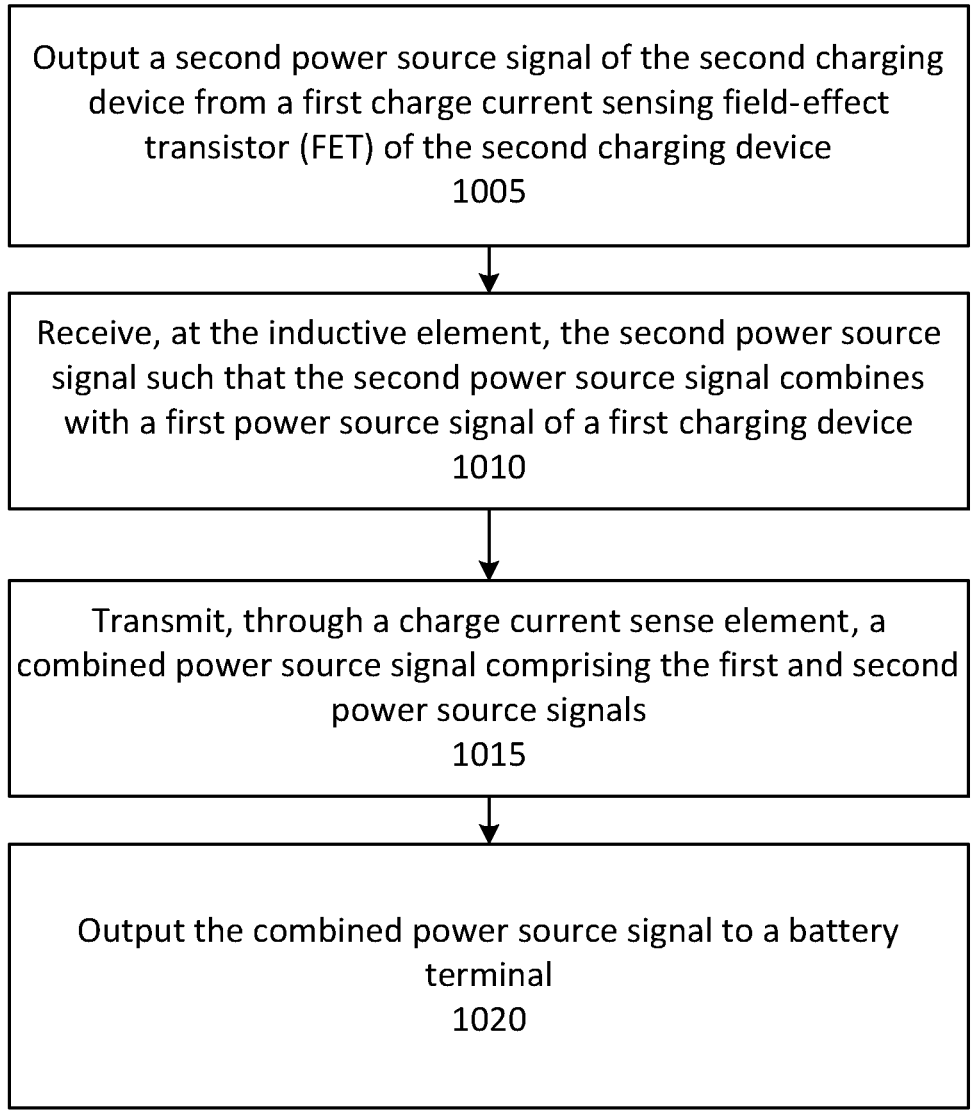
FIG. 10 is a flow diagram depicting a method for outputting a combined power source signal to a battery terminal in accordance with various embodiments.

FIG. 10 is a flow diagram depicting a method for outputting a combined power source signal to a battery terminal in accordance with various embodiments. In some embodiments, the method of FIG. 10 may be implemented in combination with the method illustrated in FIG. 8 and/or FIG. 9. In an operation 1005, the system outputs a second power source signal of the second charging device from a first charge current sensing field-effect transistor (FET) of the second charging device. Here, the power source of secondary/slave charging device is output through a battery FET, such as the FET 222 of the charging IC 202b of FIG. 6B. In an operation 1010, the system receives, at an inductive element, the second power source signal such that the second power source signal combines with a first power source signal of the first charging device.

In an operation 1015, the system transmits or conveys, through the charge current sense element, a combined power source signal comprising the first and second power source signals. The charge current sense element may be, for example, the FET 222 of the charging IC 202*a* of FIG. 6A or other sense element. In an operation 1020, the system outputs the combined power source signal to a battery terminal so that the battery can be charged as disclosed herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The embodiments described herein may be implemented on an IC, an analog IC, an RFIC, a mixed-signal IC, an ASIC, a printed circuit board (PCB), an electronics device, etc. The embodiments may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), etc.

An apparatus implementing the embodiments described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

The previous description of the disclosed various embodiments is provided to enable any person skilled in the art to make or use the claims. Various modifications to these various embodiments will be readily apparent to those skilled in the art, and the generic principles defined herein may be applied to other embodiments without departing from the spirit or scope of the claims. Thus, the claims are not intended to be limited to the various embodiments shown herein but are to be accorded the widest scope consistent with the principles and novel features disclosed herein.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present method and apparatus.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some various embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present method and apparatus. Various modifications to these embodiments will be readily apparent to those skilled in the art, and the generic principles defined herein may be applied to some embodiments without departing from the spirit or scope of the method and apparatus. Thus, the present method and apparatus is not intended to be limited to the embodiments shown herein but is to be accorded the widest scope consistent with the following claims and the principles and novel features disclosed herein.

What is claimed is:

1. A circuit for a battery charger, the circuit comprising:
a first charging device comprising:
    a first power stage coupled to a first terminal of a first inductive element, the first power stage and the first inductive element configured to generate a first current;
    a first current sense element coupled between a first charging terminal and a second terminal of the first inductive element, the first current sense element configured to sense a charge current at the first charging terminal,
    wherein the first charging terminal is configured to provide the first current to a battery coupled to the first charging terminal; and
a second charging device configured to provide a second current, the second charging device comprising:
    a second power stage; and
    a second current sense element coupled between an output of the second power stage and the second terminal of the first inductive element, wherein the charge current comprises the first current and the second current.

2. The circuit of claim 1, wherein the second charging device is configured to supply at least one of a constant current or a constant voltage to the second terminal of the first inductive element.

3. The circuit of claim 1, wherein the first power stage comprises a control input and the first charging device further comprises a feedback network configured to receive the charge current sensed at the first current sense element, the feedback network being further configured to be coupled to the control input.

4. The circuit of claim 3, wherein the feedback network is further configured to receive a battery voltage sensed at a battery voltage sense element, and wherein the control input is configured to receive a signal to control the first power stage based on at least one of the charge current sensed at the first current sense element or the battery voltage sensed at the battery voltage sense element.

5. The circuit of claim 4, wherein the first charging device is configured to:
    receive, through the feedback network, an indication that the battery voltage sensed at the battery voltage sense element has reached a first threshold; and
    adjust, in response to the battery voltage reaching the first threshold, the first current.

6. The circuit of claim 5, wherein the adjustment of the first current reduces the charge current at the first charging terminal and maintains a constant voltage at the first charging terminal.

7. The circuit of claim 6, wherein the second current remains constant.

8. The circuit of claim 4, wherein the feedback network is further configured to receive an input current from an input current sense element of the first charging device.

9. The circuit of claim 4, wherein the feedback network is further coupled to a system voltage from a system voltage sense element of the first charging device, or wherein the feedback network is further coupled to a battery temperature signal from a battery temperature sense element of the first charging device.

10. The circuit of claim 1, wherein the first current sense element comprises a first field-effect transistor (FET).

11. The circuit of claim 10, wherein the first power stage comprises a second FET and a third FET that are configured in a buck converter topology in conjunction with the first inductive element and a capacitive element coupled between the second terminal of the first inductive element and a circuit ground.

12. The circuit of claim 1, wherein the output of the second power stage is coupled to a first terminal of a second inductive element; and
the second charging device further comprises a second charging terminal configured to couple a second terminal of the second inductive element to the second terminal of the first inductive element to provide the second current from the second charging device to charge the battery.

13. The circuit of claim 12, wherein the second current sense element is coupled between the second charging terminal and the second terminal of the second inductive element, the second current sense element configured to sense a charge current from the second charging device.

14. The circuit of claim 13, wherein:
the second current sense element comprises a fourth FET;
the second power stage comprises a fifth FET and a sixth FET configured in a buck converter topology in conjunction with the second inductive element and a second capacitive element coupled between the second terminal of the second inductive element and a circuit ground; and
the fifth FET and the sixth FET are configured to be controlled by a pulse width modulator (PWM) driver.

15. The circuit of claim 1, further comprising a third charging device coupled to the second terminal of the first inductive element such that the charge current comprises current from the first charging device, the second charging device, and the third charging device.

16. A method comprising:
generating, by a first power stage of a first charging device coupled to a first terminal of an inductive element, a first current;
sensing, by a first current sense element coupled between a charging terminal and a second terminal of the inductive element, a charge current at the charging terminal;
providing the first current to a battery coupled to the charging terminal;
generating, at least partially by a second charging device comprising a second power stage, a second current; and
providing, by a second current sense element coupled between an output of the second power stage and the second terminal of the inductive element, the second current to the second terminal of the inductive element, wherein the charge current comprises the first current and the second current.

17. The method claim 16, wherein the second charging device supplies a constant current to the second terminal of the inductive element.

18. The method claim 16, wherein the second charging device supplies a constant voltage to the second terminal of the inductive element.

19. The method of claim 16, further comprising:
receiving, through a feedback network of the first power stage, the charge current sensed at the first current sense element;
receiving, through the feedback network, a battery voltage sensed at a battery voltage sense element; and
sending, to a control input of the first power stage in response to at least one of the sensed battery voltage or the sensed charge current received through the feedback network, a signal to adjust the first power stage.

20. The method of claim 19, further comprising:
receiving, through the feedback network, an indication that the battery voltage has reached a first threshold; and
adjusting, in response the battery voltage reaching the first threshold, the first charging device.

21. The method of claim 20, wherein the adjusting of the first charging device comprises controlling the switching circuit first power stage to reduce the charge current at the charging terminal.

22. The method of claim 20, further comprising maintaining an output of the second power stage of the second charging device after the battery voltage has reached the first threshold.

23. A device, comprising:
means for generating, in a first charging device coupled to a first terminal of an inductive element, a first current;
means for providing the first current from a second terminal of the inductive element to a first charging terminal, wherein a battery is coupled to the first charging terminal;
means for sensing a charge current at the first charging terminal, the means for sensing coupled between the first charging terminal and the second terminal of the inductive element; and
means for providing a second current via a current sense element coupled between an output of a second charging device and the second terminal of the inductive element, wherein the charge current comprises the first current and the second current.

24. A circuit, comprising:
a first charging device comprising a first current sensing element, an output of the first charging device coupled to a first terminal of a first inductive element, the first charging device configured to provide a first current through the first inductive element and the first current sensing element; and
a second charging device configured to provide a second current, the second charging device comprising a second current sensing element coupled to an output of the second charging device, wherein the output is further coupled to a second terminal of the first inductive element, wherein the second current sensing element is configured to provide the first current and the second current to the battery.

25. The circuit of claim 24, wherein the first charging device is coupled to a power supply, and the second charging device is coupled to the power supply.

26. The circuit of claim 24, wherein the first charging device comprises a first power stage and wherein a filter is coupled between an output of the first power stage and a charge output of the second charging device.

27. The circuit of claim 26, wherein a node in the filter is coupled to the first current sensing element.

28. The circuit of claim 24, wherein the first charging device comprises a primary charging device and the second charging device comprises a slave charging device.

29. The circuit of claim 24, wherein the first charging device is configured to provide a variable current to the battery and the second charging device is configured to provide a substantially constant current to the battery.

* * * * *